Fig. 1.

Inventor
Eugene S. Murphy
By
Joseph W. Malleck
Att'y

Inventor
Eugene S. Murphy
By Joseph W. Malleck
Atty.

Fig. 4.

Inventor
Eugene S. Murphy
By Joseph W. Malleck
Atty.

United States Patent Office 3,312,061
Patented Apr. 4, 1967

3,312,061
TORQUE CONVERTER EMPLOYING
RING VALVE
Eugene S. Murphy, Rockford, Ill., assignor to Borg-Warner Corporation, Chicago, Ill., a corporation of Illinois
Filed Sept. 28, 1965, Ser. No. 490,841
17 Claims. (Cl. 60—54)

This invention relates to a transmission and more particularly to transmissions employing a hydrokinetic torque converter which provides continuous driving relationship with an output means.

Particularly in the heavy duty transmission field, such as that employed by earth moving vehicles or off-highway vehicles, the main driveline incorporates a torque converter continuously in driving connection with a gear train which in turn connects with the driven vehicle wheels or track. Therefore, in changing between forward and reverse gear ratios in the mechanical gear train, a certain degree of shock is experienced during such transition. To alleviate this condition, throttling or dissipation of the power transmitting capabilities of the torque converter is desired. To this end, an approach has been proposed to use a member for selectively interrupting the circulatory flow of such torque converters to reduce transmitted power; current versions, although achieving a certain degree of shock dissipation, still lack satisfactory control of the member, which hereinafter shall be called a ring valve.

The primary object of this invention is to provide a ring valve for a hydrokinetic torque converter which is more positively operated and experiences smoother application than heretofore possible with prior art constructions.

Another object of this invention is to provide a hydraulic torque converter with a ring valve normally stored in the core chamber thereof and which is easily adapted to current torque converter design so as not to interfere with blading and toroidal channel definition.

A more specific object of this invention is to provide a torque converter having a bladeless core chamber for normally storing a ring valve, said ring valve being operated by a balance of forces comprising a resilient means normally urging the ring valve in one direction and a hydraulic means effective to selectively overcome the resilient means for urging the ring valve in an opposite direction. Other features comprehend hydraulic controls for the ring valve responsive to means for varying the division of power through the torque converter and another output means, or responsive to a control which is utilized in shuttling the transmission between a forward and reverse driving condition. In situations requiring automatic modulation of the impeller to avoid shock loads, the control means is alternatively provided for automatically operating the ring valve in response to an overloaded condition of the impeller. A feature pursuant to this is the provision of a scoop tube which applies a hydraulic retracting pressure to the ring valve in accordance with centrifugal fluid pressures in the core chamber. Upon overload of the impeller and the ensuing drop in speed thereof, the release pressure becomes inadequate to maintain the ring valve retracted.

Other objects and advantages of this invention will become more apparent from the following detailed description taken in connection with the accompanying drawings in which.

Figure 1:
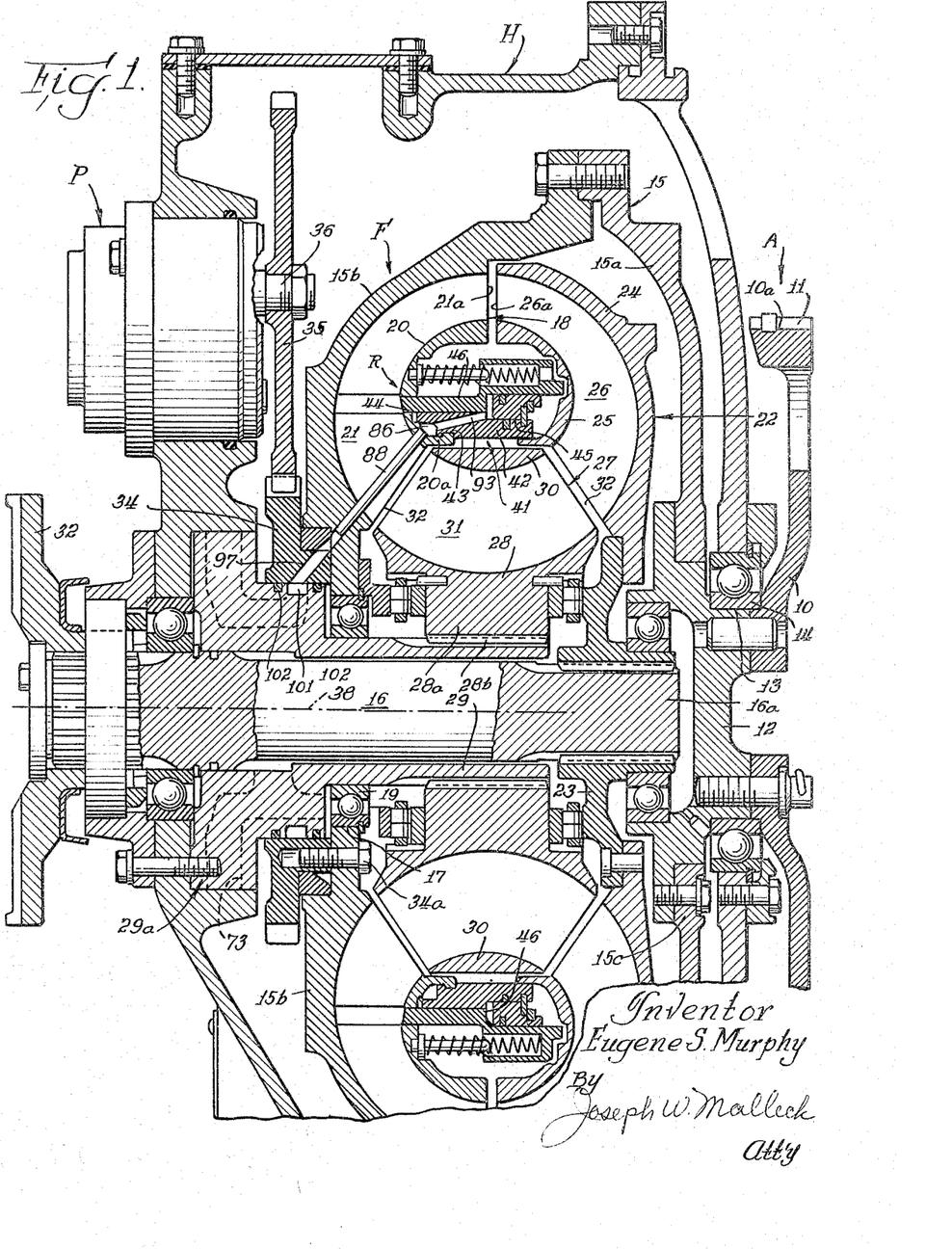
FIGURE 1 is a central sectional view of a transmission employing a torque converter and embodying the principles of this invention.
Figure 1A:
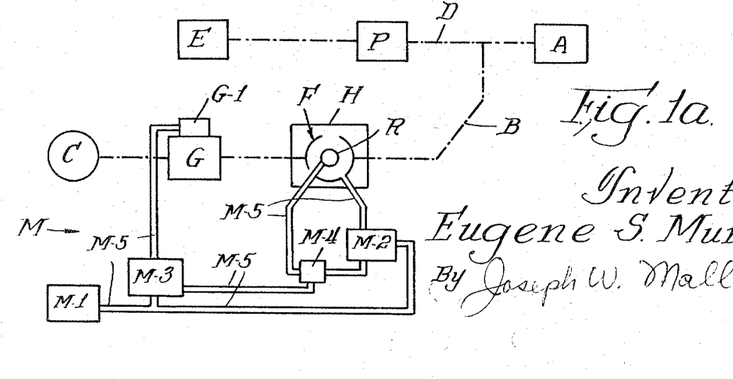
FIGURE 1a is a schematic illustration of the transmission system herein.

Turning now to the drawings and particularly to FIGURE 1a, the transmission system embodying the principles of this invention broadly comprises: a rotary input means A providing rotative power from such means as a diesel engine or the like; a first power train B connecting with a first rotary output means C; a second power train D drivingly connected with a second rotary output means E. The first power train B includes a hydrokinetic torque converter F enclosed within a housing H, the torque converter being connected in series with a mechanical gear train G which in turn connects with the output means C. The second power train D includes a mechanical power takeoff unit P which in turn is drivingly associated with such means as auxiliary pumps constituting the rotary output means E. The mechanical gear train of the first power train is changed in speed ratio by operation of a plurality of hydraulic clutches G-1, particularly of the double-acting type. A ring valve R is carried by the torque converter for varying the power transmitting capabilities thereof.

A control means M is employed for operation of the hydraulic torque converter and the hydraulic clutches of the first power train and may preferably comprise (see also FIGURE 3) a pressurized fluid source M-1, a pressure regulator valve assembly M-2, a manually operated selector means M-3 for directing fluid to the various clutches G-1, a hydraulic relay means M-4 for timing the application of fluid force to the ring valve R as signalled by operation of the manual selector means G; and the inclusion of various hydraulic conduits M-5 interconnecting the various elements of the hydraulic control.

Turning now in more particularity to the components of the transmission and controls, and particularly to components of the first power train (as shown in FIGURE 1), the rotary input means A has a flanged member 10 provided with a plurality of splines 11 formed along its outer periphery 10a and is drivingly coupled to a hub 12 rotatably journalled within an opening 13 of the housing H by bearing 14.

The hydraulic torque converter F comprises a torque converter casing 15 enclosed in the transmission housing H including a front portion 15a coupled at 15c to the hub 12 and a rear portion 15b journalled about an assembly of an intermediate driven shaft 16 extending through the rear portion of the housing H and a sleeve shaft 29 coupled to the housing H at 29a; the journal is promoted by a bearing 19 received in an opening 17 thereof.

The torque converter may comprise an impeller 18 having an outer wall formed by the rear portion 15b of the torque converter housing 15 and in an inner core wall 20 between which impeller blading 21 may extend. A turbine 22 has an outer wall 24 carried on a hub 23 splined to the front portion 16a of intermediate shaft 16 and has an inner core wall 25 between which turbine blading 26 may extend. A stator element 27 has an outer wall 28 integrally formed on a hub 28a splined at 28b to the sleeve shaft 29 extending above the intermediate shaft 16; the stator element has an inner core wall 30 between which stator blades or vanes 31 extend. The three bladed elements 18, 22, and 27 define a toroidal chamber 32 having a core 32a; within the chamber the various element blades 21, 26, and 31 extend; the blading is adapted to occupy substantially all of the toroidal chamber 32. The torque converter shown in FIGURE 1 is of the generally known "Schneider" type wherein the stator element is located in the radially innermost flow section with the other elements occupying substantially all the remaining space; the outlet 21a of the impeller blades and the inlet 26a of the turbine blades are disposed closely adjacent at the radially outermost point of the chamber.

The mechanical gear train G which interconnects the flanged output hub 32, connected to the intermediate shaft 16, with the rotary output means C may comprise an arrangement as shown in U.S. Patent 2,953,038, comprising a plurality of gears certain of which is selectively engaged by operation of double-acting clutches here schematically illustrated as G-1.

The second power train D including the power-take-off unit P has a spur gear 34 drivingly coupled to the inner portion of the housing portion 15b of the torque converter by fasteners 34a. The gear 34 is in meshed driving relationship with an idler gear 35 supported on an idler shaft 36, the idler shaft also carrying a gear for connection to a counter shaft cluster which in turn may be drivingly associated with auxiliary pumps G-1 effective to generate fluid power for operation of such means as a digging shovel through a piston and cylinder arrangement (not shown).

Figure 2:
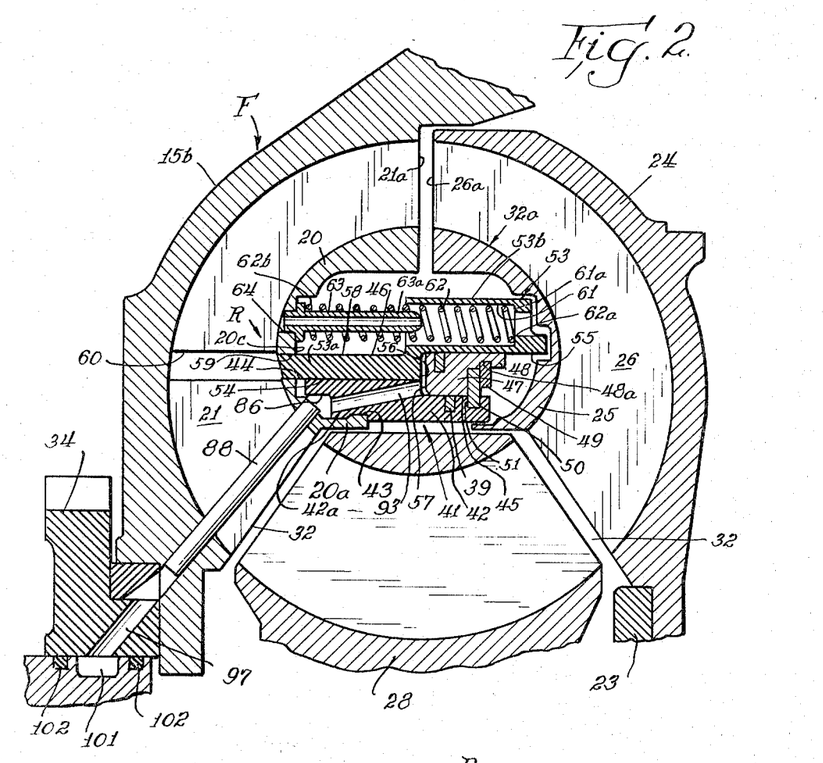
FIGURE 2 is an enlarged sectional view of a portion of the structure of FIGURE 1 particularly illustrating the ring valve.

The ring valve R particularly comprises a cylinder assembly 41 comprised of an annular sleeve 42 having one extremity 42a mounted upon the annular extension 20a of the inner core wall 20 of the impeller; extension 20a has an outwardly extending ridge 43 which is received by a mating groove in the extremity 42a of the sleeve 42 for providing a locking connection therebetween; extension 20a provides the sole journalling support for the sleeve 42. Sleeve 42 has defined, on its outer periphery, stepped cylindrical surfaces 44 and 45 separated by a radially directed shoulder 46.

An annular reaction ring 47 is carried at the other extremity of sleeve 42 and has an annular flange 48 provided with a groove 48a for receiving a lock ring 49 effective to lock against a similar ring 50 disposed in a groove 51 in the reduced portion of the sleeve 42. Ring 47 and sleeve 42 are locked together as a unit; the unit is bi-partite to facilitate mounting and assembly convenience.

The ring valve 53 which moves between a nested position within the core chamber 53 and another position for interrupting the circulatory flow in the toroidal chamber 32, comprises radially inwardly facing stepped surfaces 54 and 55 separated by a radially directed surface or shoulder 56; surfaces 54 and 55 are adapted to mate and slide on the surfaces 44 and 45 of the cylinder assembly. Means 39 are provided between the stepped cylindrical surfaces of the respective valve and cylinder assembly to provide a sealing relationship therebetween and by their cooperation to provide a pressure chamber 57 between the opposed shoulder 56 and 46 of each of the members.

Portion 53a of the ring valve carries a surface 58 and is adapted to extend through an annular slot or opening 59 in the inner core wall 20 of the impeller thereby providing for an entrance into the bladed toroidal chamber 32. A plurality of slots 60, of sufficient circumferential dimension to receive the portion 53a of the ring valve, are defined transversely across the cascade of blades 21 of the impeller. The ring valve further has a portion 53b disposed radially outwardly from portion 53a and has a bore 61 with a center line extending generally parallel to the axis 38 of rotation of the torque converter. A coil compression spring 62 has one end 62a received in the bore 61 bottoming against the extremity 61a of the bore and has another end 62b journalled on a pilot 63 provided with a nose 63a received snugly in a recess 64 defined in the inwardly facing surface 20c of the core wall of the impeller. There are approximately forty circumferentially spaced coil springs 62 in the preferred embodiment of FIGURE 1 (see FIGURE 4), and which normally urge the ring valve to a retracted position within the core chamber.

Turning now to the hydraulic control system M (see FIGURE 3), the pressurized fluid source may comprise a gear type pump 65 effective to draw fluid from a sump of fluid reservoir 66, the fluid output of pump 65 is conveyed by passage 67 in which is interposed means 67a; the fluid is filtered by means 67a when pressure is 15–20 p.s.i. or lower and thereafter is bypassed through passage 68 back to passage 67. Passage 69 conveys the pressurized source fluid from passage 67 to the pressure regulator assembly M-2 which here preferably employs a main pressure regulator valve 70 effective to maintain a pressure in conduit 67 approximately 203–213 p.s.i.; the fluid output 71 of valve 70 is in communication by way of passage 72 with the passage 73 (see FIGURE 1) opening into the outer surface of the flanged portion of the sleeve shaft 29 of the stator and which communicates with the interior of the torque converter housing adjacent the bearing 19 journalling element 18. Fluid thereby makes its way between the inlet edge of the blades of element 18 and the trailing edges of the stator element for entering the toroidal bladed chamber to supply a fluid filling thereof. The fluid output passage of valve 70 is also placed in communication with the inlet side 74 of a second regulator valve 75 which is effective to regulate the converter supply pressure, preferably between 80–90 p.s.i.; the fluid outlet 76 of valve 75 is placed in communication with a third regulator valve 77 regulating lubrication pressure delivered to various aspects of the transmission G between 15–25 p.s.i. The fluid outlet 78 to the torque converter fluid circuit is placed in communication with the inlet 76 of valve 77 with an oil cooler 79 interposed therein. The outlet 80 of the third regulator valve 77 returns to sump 66. Specific definition of the regulator valves may be gained by reference to the U.S. patent application, which is incorporated herein by reference.

Figure 3:
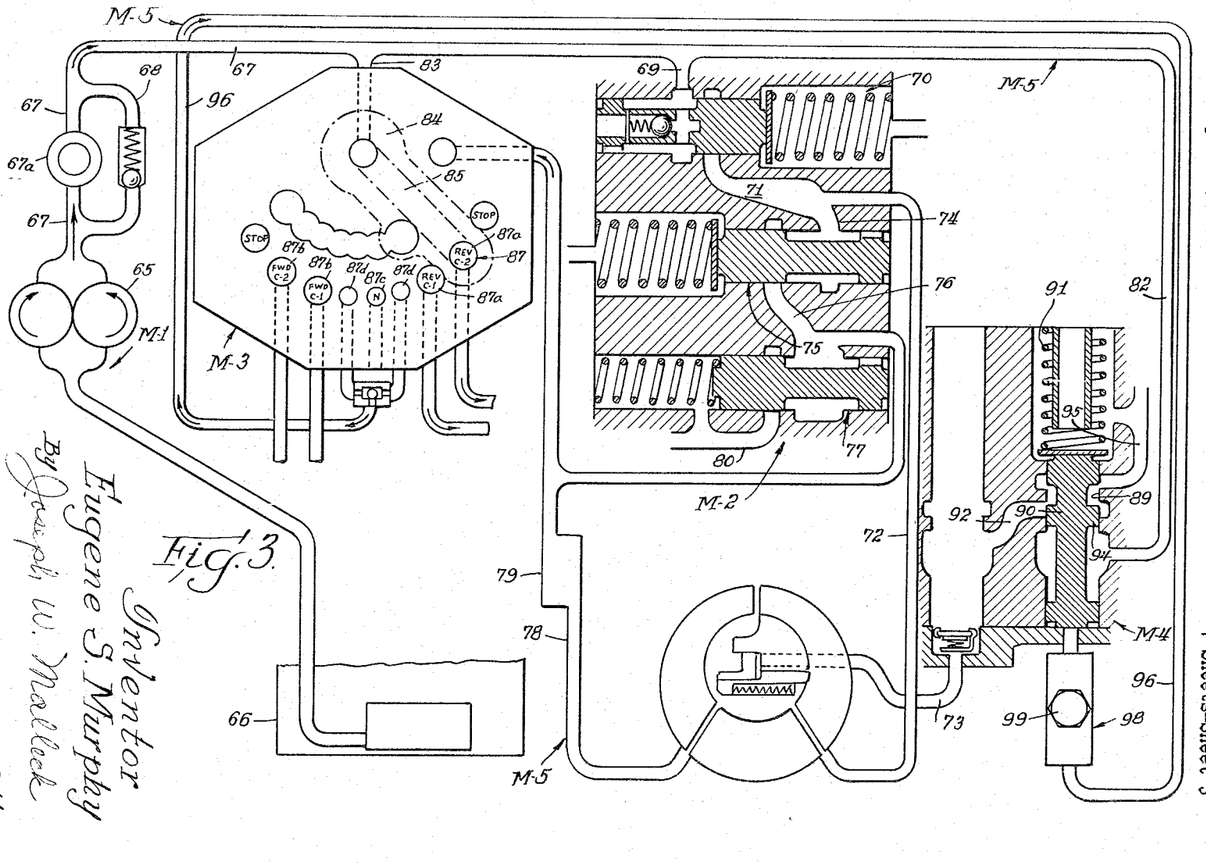
FIGURE 3 is a schematic illustration of one hydraulic control for a system embodying the transmission of FIGURE 1.

The main supply pressure in passage 67 is tapped for utility purposes at two locations, one for operation of the converter ring valve by way of conduit 82 and at another point a passage 83 delivers fluid to the manual selector means M-3 for ultimate conveyance to the various hydraulic clutches G-1 of the mechanical gear train. The manual selector means M-3 may comprise a rotary selector valve 84 having a channel 85 therein effective to selectively communicate the inlet side 83 thereof with one of the plurality of outlets 87 having terminal portions arranged in an arcuate manner; certain of the outlets 87a being adapted for communication with hydraulic clutches to effect the reverse mechanical drive condition and certain other of the outlets 87b being adapted to effect a forward drive condition. The forward and reverse outlets are separated by a neutral outlet 87c which also has interposed therebetween outlets 87d in communication with the relay means M-4 by conduit 96. Thus, upon rotary movement of the manual selector valve 84 between a reverse and forward condition, the main regulated pressure will be temporarily transmitted to the interposed outlets 87d in communication with the relay valve M-4 and thereby signals an operative movement thereof.

The relay valve M-4 is important for providing a timed operation of the relay valve; to this end the valve M-4 has a cylindrical bore 89 within which is disposed a spool valve member 90 spring biased by compression spring 91 in one axial direction toward a position whereby passage 82, carrying main regulated fluid pressure, is interrupted from communicating with an outlet conduit 92 communicating with the pressure chamber of the ring valve. Interruption is provided by a land 94 on the spool valve. In such condition the outlet conduit 92 is in communication with another conduit 95 leading back to sump. To effect movement of the spool valve 90 contrary to the spring bias, a pressure signal received from the manual selector means M-3 through passage 96 is communicated to the end of valve member 91 in opposition to the force of the springs. Such communication is restricted by an orifice means 98 which is variable by way of a threaded flow control valve 99 to change the degree of pressure built up against the end of the spool valve 91. As a spool valve 91 moves toward the compression spring, free communication is gradually permitted between the inlet 82 and outlet 92 thereby pressurizing the chamber urging the ring valve in a direction tending to interrupt fluid flow in the toroidal fluid chamber.

The specific structural fluid communication of conduit 92 with the pressure chamber 57 of the ring valve (see FIGURES 1 and 2) comprises one or more conduits 93 in the sleeve 42 terminating with an annular recess 86; recess 86 is in turn communicated with at least one fluid passage 88 extending through one or more blades from inner core wall 20 to the outer wall thereof. Passage 88 communicates with a biased passage 97 in spur gear 34 which in turn communicates with an annular groove or recess 101 in the outer surface of the flanged portion of the stator sleeve shaft 29, which is normally stationary. The groove 101, forming part of a hydraulic slip connection with the spur gear of the power-take-off assembly, is flanked by seal rings 102 received in respective grooves in the outer surface of a stepped portion of sleeve shaft 29 and which rotatably and sealingly engage the inner surface of the spur gear 34. Any suitable conduits 73 may then be defined to connect with conduit 92 of the controls.

Figure 4:
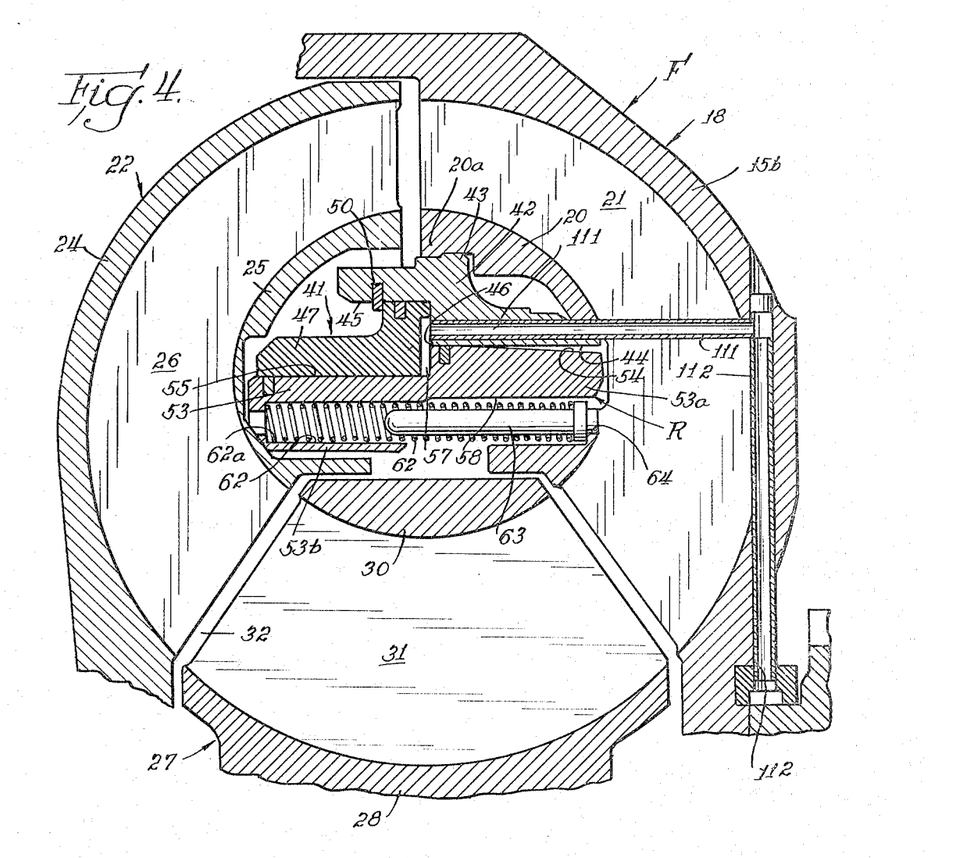
FIGURE 4 is an alternative embodiment of the ring valve.
Figures 5, 6:
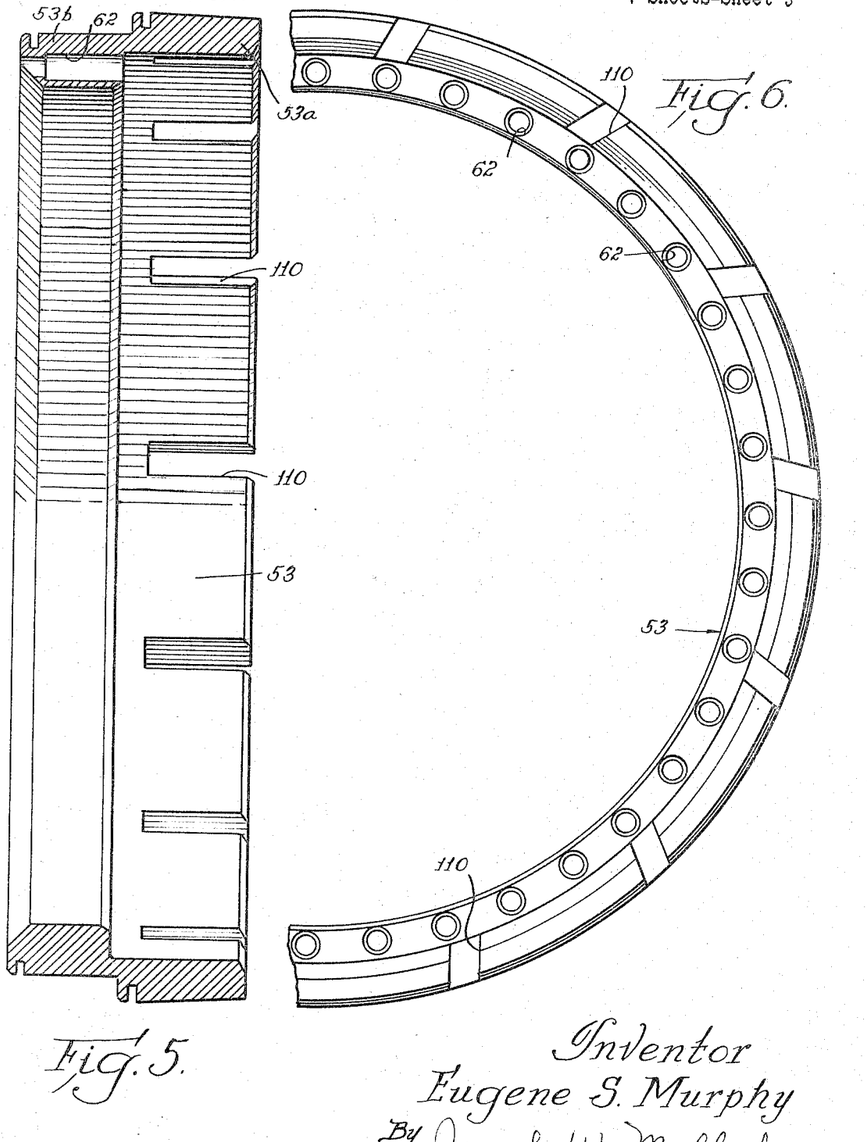
FIGURE 5 is an enlarged central sectional view of the ring valve of FIGURE 4.
FIGURE 6 is a side-elevational view of the valve of FIGURE 5.

FIGURE 4 illustrates an alterative to that of FIGURE 1 wherein the cylinder assembly is radially inverted within the bladeless core chamber to act as journal for the slidable valve member 53 on its exterior or outer surfaces 54 and 55 (the ring valve is journalled on its inner surfaces in FIGURE 1). Except as indicated, the structural parts correspond and similar reference numerals to that of the preferred embodiment are utilized. The ring of circumferentially spaced slots 110 effective to receive the blades 21 of the impeller therein, while slightly spaced from the edges of the slots, when the ring valve is in the position in the chamber 32 interrupting fluid circulation. The blades 21 may be maintained in their originally designed profile without cut-outs. Also, conduit 111 is employed to convey fluid to chamber 57 of the ring valve R independently of blades 21 and intersects with a conduit 112 carried by portion 15b.

Figure 7:
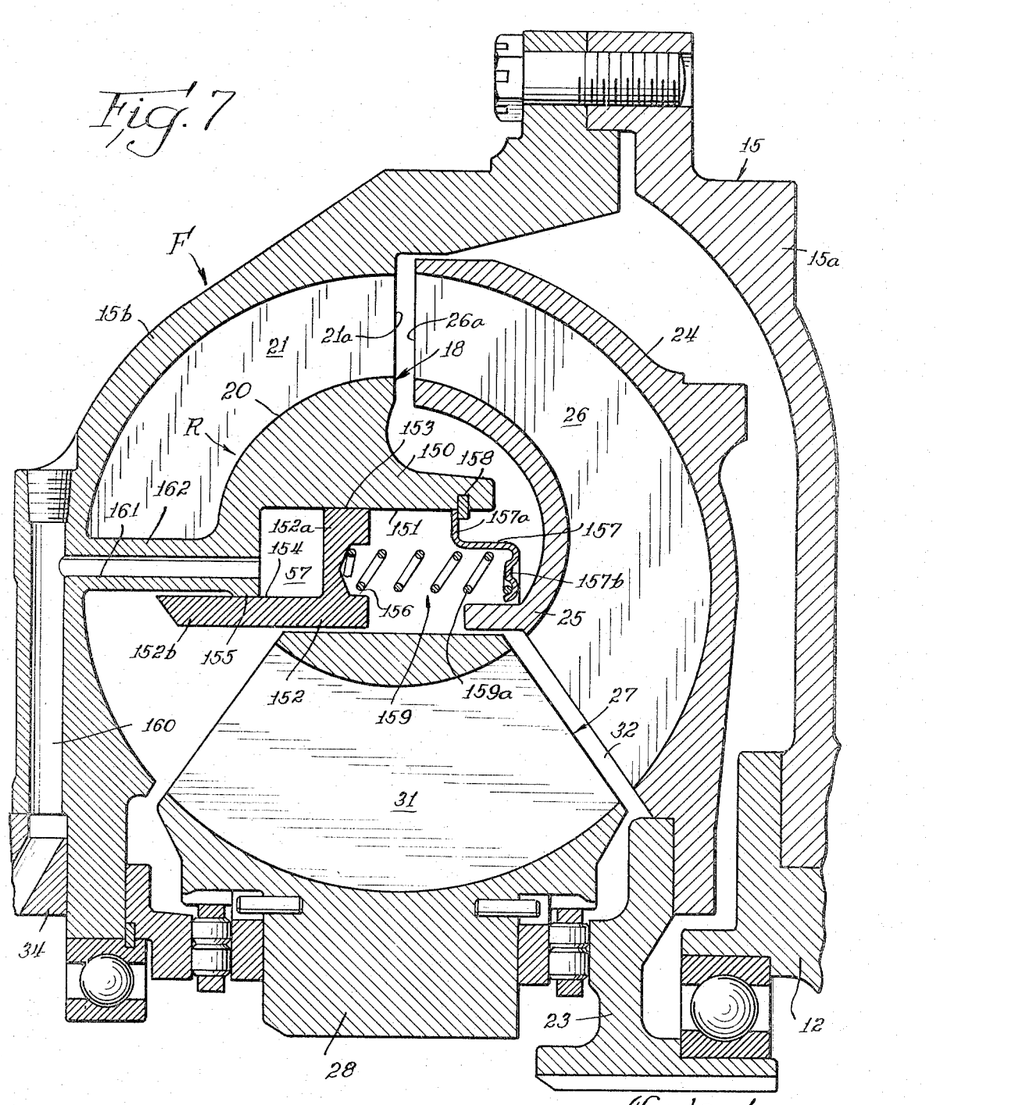
FIGURES 7 and 8 are each illustrations of other alternative embodiments of ring valve constructions of this invention.

FIGURE 7 illustrates another embodiment, the parts similar to that of the preferred embodiment will also have identical reference numerals. This embodiment specifically differs in that the cylinder assembly for journalling the ring valve is an integral extension of the core wall of the impeller; the arrangement is adapted so that spring forces are normally utilized to apply the valve member for interrupting the fluid flow in the toroidal chamber and hydraulic pressure is utilized to selectively overcome the spring forces for retracting the valve member into the bladeless core chamber.

Specifically, the core wall 20 of the impeller has an axial extension 150 extending substantially transversely across the inner core chamber and has a cylindrical surface 151 within which is journalled the slidable ring valve member 152. Ring valve member 152 is stepped with a portion 152a effective as a piston and cooperates to define the pressure chamber 57 in cooperation with wall 20; portion 152a carries an outer cylindrical surface 153 effective to slidably mate with the cylindrical surface 151 of extension 150. The other portion 152b of the valve member is effective to be moved into and across the toroidal chamber and has an outer surface 154 effective to be journalled against the trailing edge 155 of the inner core wall 20. The valve member is normally biased to interrupt fluid flow by a spring assembly 159 comprising one or more circumferentially spaced coiled compressing springs 159a, each having one end bearing against the wall of the bore 156 defined in the rear face of the piston portion 152a and another end bearing against a sheet metal bracket 157. The bracket 157 has a lip 157a abutting a stop ring 158 received in the integral extension 150; the bracket has plurality of journals 157b for receiving the ends of the springs 159a.

Fluid is conveyed to the pressure chamber 57 of the embodiment of FIGURE 7 by at least one radially directed passage 160 intersecting with an axial directed passage 161 passing through means 162 formed independently of the blades of the impeller.

Figure 8:
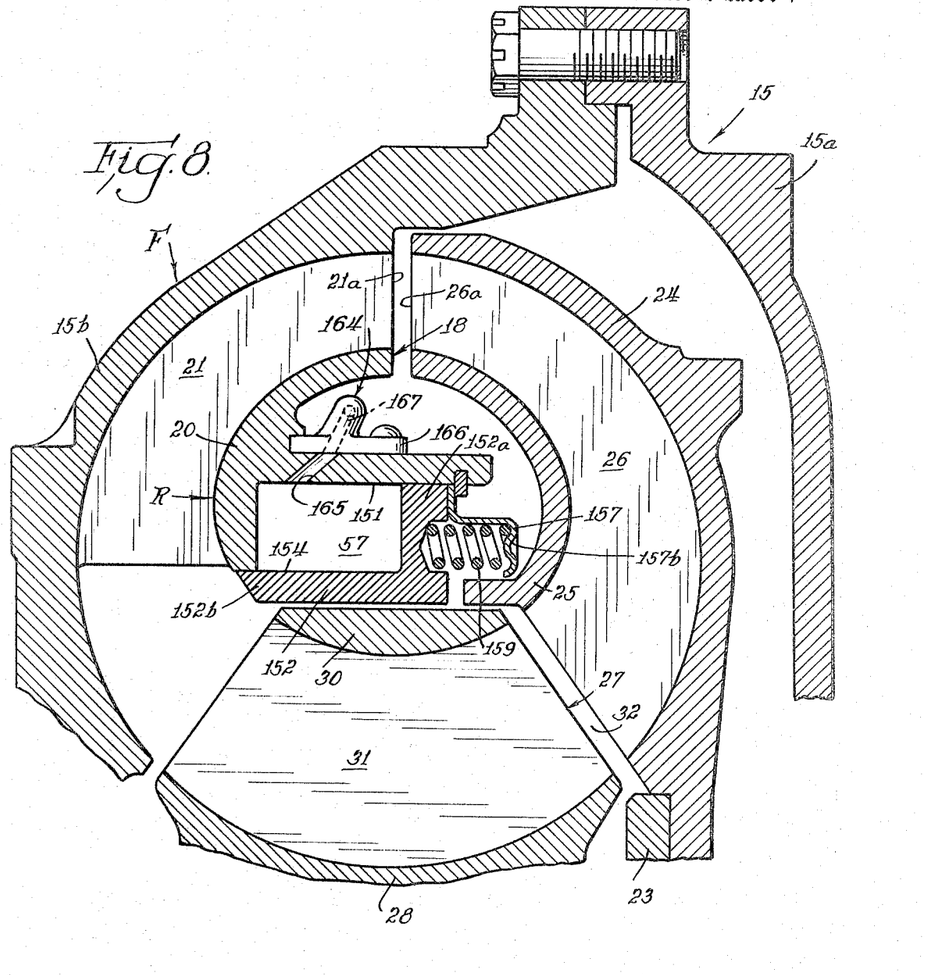

FIGURE 8 illustrates a structural variation which is particularly useful with the embodiment of FIGURE 7. A scoop or pitot assembly 164 is employed to automatically regulate or govern the speed of the impeller of the torque converter. To this end, the pitot assembly 164 comprises scoop tube having a channel 167 communicating the bladeless core chamber with the pressure chamber 57 in cooperation with a passage 165 extending through the integral extension 150 of the core wall 20. The scoop tube is mounted upon a ring 166 which is journalled upon the exterior or outer annular surface of the integral extension 150. As the impeller speed increases, the pitot assembly scoops oil from within the bladeless core chamber and causes fluid pressure to build up within the pressure chamber 57. This pressure is applied against the back side of the piston 152a of the slideable ring valve. When the impeller is turning at the desired rotary speed the centrifugal head developed by the fluid will be sufficient to overcome the coil compression springs normally urging the ring valve into the toroidal chamber; consequently, the ring valve will be fully retracted. If the impeller receives a reflected load from the turbine which is sufficient to cause it to drop in speed, the scoop tube accordingly will provide a reduced centrifugal pressure head. Since the spring load is constant and the opposing pressure built up by the pitot assembly is thereby lowered, due to the drop in r.p.m., the ring valve will be moved back into engagement within the toroidal fluid chamber thereby unloading the impeller and allowing its speed to build back up again.

Thus it can be seen from the above description of the preferred and alternative embodiments, that the ring valve serves the important function of the reducing shift shock of a transmission when "shuttle shifting" a vehicle between forward and reverse conditions. The ring valve engages and blocks off the toroidal fluid flow during such shift whereby the output torque from the converter can be reduced from as much as 100% down to 15% in accordance with this invention. This results in shifts at low torque and consequently considerably smoother action.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. A hydraulic torque converter comprising: a plurality of coaxially mounted bladed elements arranged to define a toroidal chamber within which the blades thereof are disposed and an internal core chamber is bladeless, one of said bladed elements having a core wall carrying means within said core chamber defining an annular shoulder separating stepped cylindrical surfaces; an annular valve disposed in said core chamber for movement between a position nested in said core chamber to a position extending into the bladed toroidal chamber, said valve having a shoulder separating stepped cylindrical walls adapted to be slidably mated with the cylindrical walls of said one bladed element; means for slidably sealing between the cylindrical surfaces of each of said annular valve and said bladed element means for thereby defining a pressure chamber between said shoulder; resilient means normally biasing said annular valve to a nested position within said bladeless core chamber; and means for selectively supplying fluid to said pressure chamber for overcoming the force of said resilient means to move the annular valve in a direction toward the position whereby it extends into the bladed toroidal chamber, whereby throttling of power flow between the bladed elements of the torque converter may be positively affected.

2. A torque converter as in claim 1, in which said annular valve is provided with a plurality of circumferentially spaced slots effective to receive the blades of said one element in interleaved fashion as said valve is moved to the position interrupting fluid flow in the bladed toroidal chamber.

3. A torque converter as in claim 1, in which said bladed element carrying the annular valve is an impeller having an annular slot at an intermediate portion of the core wall thereof, said valve being effective to extend through said slot whereby fluid dynamic forces on the valve caused by interruption of the circulatory flow will have less effect on the impeller.

4. A torque converter as in claim 1, in which said stepped cylindrical surfaces of both said element means and annular valve are concentric with respect to the axis of rotation of said torque converter whereby sliding relative movement therebetween will be directed substantially axially.

5. A torque converter as in claim 1, in which said bladed element has a radially inner core wall and an outer wall between which said blades extend for defining a portion of the toroidal chamber, said torque converter further comprising means for conveying fluid from the outer wall through at least certain of said blades to the inner wall and thence to said pressure chamber.

6. A hydraulic torque converter comprising: a plurality of coaxially mounted bladed annular elements arranged to define a toroidal chamber within which the blades thereof are disposed, said elements each having an inner wall for defining an internal core chamber which is bladeless, the core wall of one of said bladed elements carrying a bi-partite cylinder assembly disposed within said core chamber, said cylinder assembly comprising a sleeve having an end ring mounted at one extremity thereof; an annular unitary valve slidably mounted on said cylinder assembly and having a stepped configuration for defining a pressure chamber in cooperation with the cylinder; resilient means operatively acting between said core wall and a radially offset portion of said valve for normally biasing said valve in a direction to nest within said core chamber; and means for selectively supplying pressurized fluid to said pressure chamber for overcoming the force of said resilient means to move the valve member into the toroidal chamber for interrupting fluid flow therethrough.

7. A hydraulic torque converter as in claim 6, in which said resilient means normally biases the valve member in a direction toward a position whereby it extends into the bladed toroidal chamber, and said selective means for supplying fluid is effective to overcome the force of said resilient means to move the annular valve member to the nested position within the bladeless core chamber.

8. A torque converter as in claim 6, in which said cylinder assembly defines an internal cylinder within which said valve member is positioned.

9. A torque converter as in claim 6, in which said valve member cooperates to form a cylinder with said cylinder assembly which is external of the sleeve thereof.

10. A torque converter as in claim 6, in which said bladed elements comprise a rotatable impeller and a turbine, with a fixed stator, the stator being positioned at the radially innermost portion of the toroidal chamber with the sum of said elements occupying substantially all of the toroidal chamber.

11. A torque converter as in claim 6, in which said resilient means comprises a coiled compression spring and said valve member has an axially extending bore defined in a radially outer offset portion for journalling one end of said resilient means, and the inner core wall of said one element has an axially extending pilot for journalling the opposite end of said resilient means.

12. A torque converter as in claim 8, in which said means for selectively supplying fluid to said pressure chamber comprises conduits extending between inner and outer walls of said bladed elements and disposed independently of the blades extending therebetween.

13. A transmission, comprising: input means; at least two rotary output means each drivingly connected with said input means; a torque converter interposed in the driving connection between one of the output means and said input means, and having a bladed toroidal fluid circulating chamber and a bladeless core chamber; and fluid interrupting means normally biased for positioning in said core chamber and selectively releasable to extend into said fluid circulating chamber for interrupting the fluid power transmission therethrough, thereby varying the division of power between said two output means.

14. A transmission as in claim 13, in which said driving connection with said one output means also comprises a change speed means having a control element for operation thereof, said fluid interrupting means being responsive to movement of said control element for being selectively released to extend into said toroidal chamber.

15. A transmission as in claim 13, in which said fluid interrupting means comprises an annular ring valve having a piston flange at one end thereof, said torque converter having at least one rotatable bladed element thereof provided with an interior core wall having an integral extension defining a fluid cylinder within which said piston flange of said valve may slide, said one bladed element having an annular radially inner termination against which said sleeve may be supported for entering the toroidal chamber.

16. A transmission as in claim 15, in which said means for normally biasing said ring valve into said core chamber comprises a control supplying pressurized hydraulic fluid effective to act against the piston flange of said ring valve.

17. A transmission, as in claim 13, which further comprises a scoop tube effective to trap and transmit circulating fluid of the torque converter to said fluid interrupting means, said scoop tube being arranged so that upon an increase of speed of said input means, the transmitted fluid will increase in force to provide said biased positioning.

No references cited.

EDGAR W. GEOGHEGAN, *Primary Examiner.*